Figure 1:
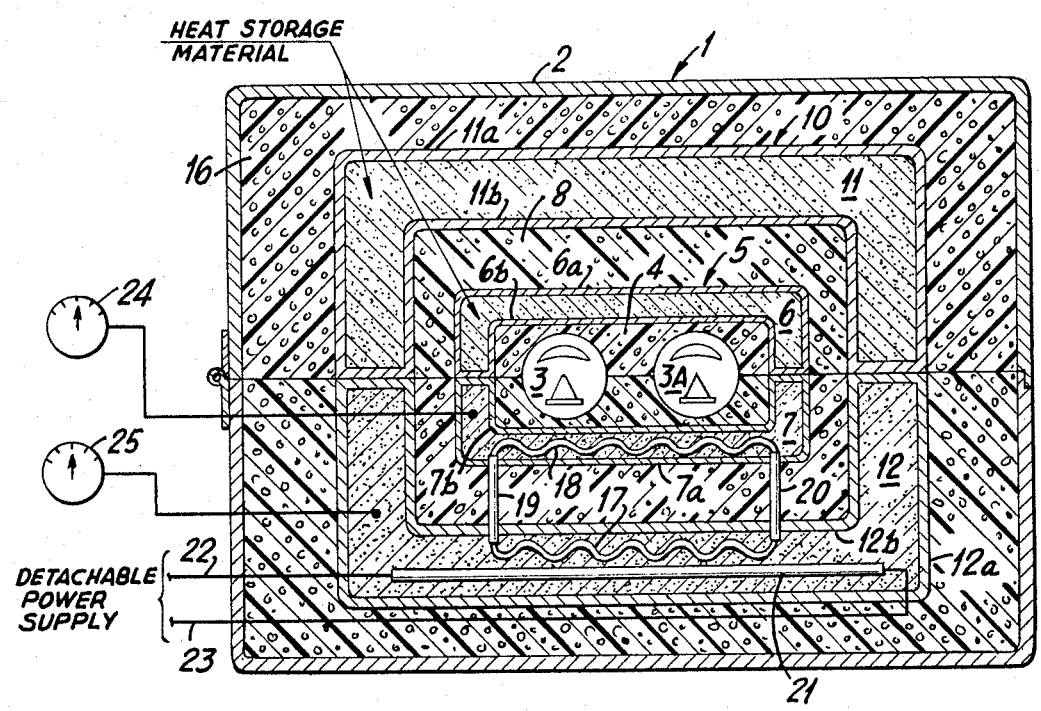

Sept. 20, 1966     C. D. SNELLING     3,273,634

SELF-SUSTAINING TEMPERATURE CONTROL PACKAGE

Filed Jan. 4, 1965     2 Sheets-Sheet 1

INVENTOR.
CHARLES D. SNELLING

BY

Hopgood & Calimafde
ATTORNEYS.

Sept. 20, 1966    C. D. SNELLING    3,273,634
SELF-SUSTAINING TEMPERATURE CONTROL PACKAGE
Filed Jan. 4, 1965    2 Sheets-Sheet 2

INVENTOR.
CHARLES D. SNELLING
BY
Hopgood & Calimafde
ATTORNEYS.

United States Patent Office 3,273,634
Patented Sept. 20, 1966

3,273,634
SELF-SUSTAINING TEMPERATURE CONTROL PACKAGE
Charles D. Snelling, 2949 Greenleaf St., Allentown, Pa.
Filed Jan. 4, 1965, Ser. No. 422,894
8 Claims. (Cl. 165—1)

This invention relates to a self-sustaining temperature-control package and, in particular, to a method and apparatus for closely regulating over a given period of time the temperature of a temperature-sensitive object subject to the adverse influence of an outside environment characterized by a wide variation in ambient temperature.

Extremely delicate instruments, such as precision gyroscopes, are generally adversely affected by variations in ambient temperatures. Where these are similar instruments are employed as an essential part of an instrument package for use in devices subject to the influence of fluctuating ambient temperatures or in devices adapted to obtain scientific information of a particular environment, e.g. environment probe devices, such instruments are generally standardized to a particular reference temperature. Unless extreme care is taken to maintain the delicate instrument as close as possible to its predetermined reference condition, or care taken to insure compensation for any adverse effect of the ambient environment, the delicate instruments may be rendered ineffectual or the device containing the instruments rendered practically useless for its intended purpose.

Although attempts have been made to protect the instruments or maintain them at their predetermined reference conditions, generally such attempts have led to the introduction of rather complicated temperature control devices. In my U.S. Patent No. 3,112,877, I disclose one embodiment of a device capable of more simply controlling the temperature. I now find that I can provide a device capable of achieving the desired result even more simply.

It is the object of my invention to provide a method and a transport package for closely regulating the temperature of a temperature sensitive object, such as a precision gyroscope or a material sensitive to temperature change.

Another object is to provide a dependable temperature regulation unit versatile in its application for use in systems subject to a wide range of fluctuating ambient temperatures ranging from about —200° F. to about 150° F.

Still another object is to provide as a preferred embodiment a temperature control system which is self-sustaining over a substantial long period of time and which system does not require the external application of energy to maintain its regulating effect during use.

A further object is to provide a self-sustaining temperature system capable of regulating the temperature of a temperature-sensitive object to within closely held limits, such as within a few degrees or less, for a prolonged period for time, for example 36 hours or for as long as a week.

Figure 2:
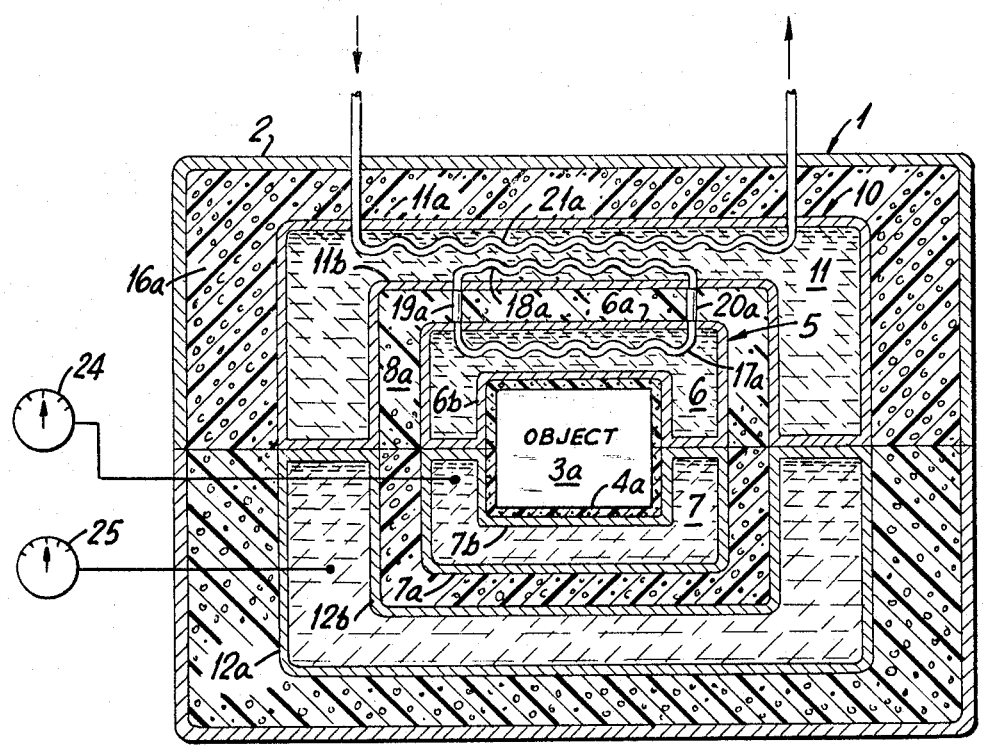
Figure 3:
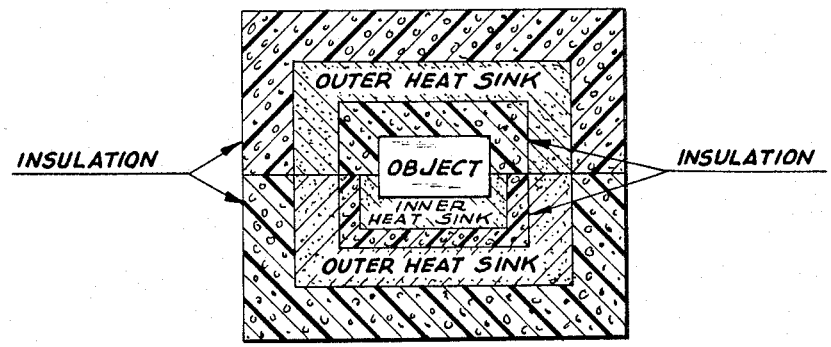

These and other objects will more clearly appear from the following description and the appended drawings, wherein:

FIGURES 1 to 3 are illustrative of three embodiments of the self-sustaining temperature control package provided by the invention.

According to a preferred embodiment of my invention, I provide a self-sustaining temperature control system for use over a prolonged period of time by utilizing a method comprising supporting the object to be protected from the ambient environment, providing a first heat reservoir or heat sink thermally associated with said sensitive object, said heat reservoir being standardized at the temperature of the object, providing an insulation about said heat reservoir or heat sink, surrounding said insulation by a second heat reservoir or heat sink at a temperature approximately that of the first heat reservoir, coupling said heat reservoirs or heat sinks together via a closed circuit heat transfer path containing a vaporizable heat transfer fluid, and then insulating the whole assembly from the ambient environment under substantially adiabatic conditions. By having two heat reservoirs or heat sinks with one surrounding the other and separated by insulation, a package is provided capable of sustaining a desired temperature within a confined portion for a substantial period of time. This enables the use of a heat storage compound having the exact temperature on the inside of the package and heat storage material of greater efficiency around it but not quite right as to temperature. By utilizing as a preferred embodiment a closed heat transfer pathway or auxiliary heater coupling the second heat reservoir to the first heat reservoir, a one-way heat transfer system is provided for heat-charging purposes. However, the heat transfer pathway is not essential in carrying out the invention. The intermediate insulation separating one reservoir from the other is essential in greatly lowering the heat transfer rate of any heat loss out of the system.

I have found that by utilizing a system under substantially adiabatic conditions, that is a system in which the heat loss to or heat gain from the ambient environment is kept to a minimum, I am able to provide a very simple self-regulating system capable of operating for a prolonged period of time without the external application or removal of heat energy during use, be it a day, several days, or for a week. By substantially adiabatic conditions, I have in mind heat energy systems in which, at worst, the rate of temperature drop of the temperature-sensitive object is maintained by means of insulation below one-half degree F. per minute and preferably below one-quarter degree F. per minute, or in which the rate of temperature rise of the object is maintained below one-quarter degree F. per minute and preferably below one-tenth degree F. per minute, over ambient temperatures fluctuating within the somewhat extreme range of about —200° F. to 150° F. Generally speaking, under the conditions in which my system normally works, the adiabatic condition is such that the temperature drop or gain does not exceed several degrees per hour. Under such conditions, I am able to control the temperature for an extended time period.

I find by preferably working under the foregoing conditions and using a fluid as the heat transfer medium between the heat sinks that very sensitive temperature regulation obtains.

In its broad aspects, the self-sustaining temperature control package comprises a container having insulatedly packed therein a temperature-sensitive object and a plurality of heat reservoirs or heat sinks, each containing a heat storage material therein. A first heat reservoir is associated with the temperature-sensitive object and in use is maintained at a temperature standardized for the sensitive object, with at least one other heat reservoir insulated from and surrounding the object and said first heat reservoir. The one other heat reservoir is usually at a temperature substantially that of the first heat reservoir. Preferably, the heat reservoirs are coupled to each other via a closed heat transfer pathway containing a vaporizable fluid.

As stated above, the inner heat reservoir associated with the temperature-sensitive object is one containing a heat storage material whose freezing point or melting point (temperature of transition) corresponds to the temperature at which the object is controlled. The outer heat reservoir is adapted to have a higher heat efficiency and may be at a temperature slightly lower than the object, but not necessarily within the permissible temperature-fluctuation range of the sensitive object. The amount of heat storage material used in the outer reservoir is generally greater than that in the inner reservoir and may range from an amount 3 times by weight of the amount in the inner reservoir to as high as 20 times the amount. In other words the ratio may range from 3 to 1 to as high as 20 to 1. The outer heat sink may be an oven-like structure having thermally associated with it a source of heat energy or heat exchange means adapted to maintain the whole oven-like structure at the desired temperature.

As illustrative of the foregoing, reference is made to FIG. 1 which shows a transportation instrument package designated generally by the numeral 1 comprising an outer casing 2 of metal, wood, plastic or the like, and showing packed within it a pair of temperature-sensitive objects 3, 3A, in this case a pair of enclosed gyroscopes surrounded and supported by insulation 4, of, for example, plastic foam, preferably urethane foam of very low heat conductivity and good shock absorbing capacity. Spatially associated with the object is a first heat reservoir or heat sink 5 maintained (when used) at a temperature the same as that of the sensitive object. In the embodiment shown, the heat sink is made up of two hollow cup-shaped halves 6 and 7 having inner and outer casings 6a, 6b, and 7a, 7b, respectively, of good heat-conductive material, such as copper, aluminum, etc. As shown in FIG. 1, the two cup-shaped halves are disposed opposite each other and fit snugly about insulation 4 surrounding the temperature-sensitive objects. Contained in the reservoir is a heat storage material having a relatively high latent heat of solidification to be described later.

Surrounding the first heat reservoir is another layer of insulation 8, e.g. urethane foam, and surrounding it is a second heat reservoir or heat sink 10 formed of two hollow cup-shaped halves 11 and 12 having inner and outer casings 11a, 11b and 12a, 12b, respectively, of good heat-conductive material such as copper or aluminum or other metals.

With regard to insulated objects 3 and 3A, these are associated with the inner heat reservoir 5. They need not be completely surrounded by insulation 4 just so long as they are adequately supported relative to the inner heat sink. The important thing is that their temperature will be controlled by the heat sink. Surrounding the outer heat reservoir is another layer of similar insulation 16 enclosed within outer casing 2 of the instrument package.

As a preferred embodiment, the first and second heat reservoirs or heat sinks 5 and 10 are thermally coupled by a closed circuit fluid heat-transfer system comprising evaporator tubing 17 of copper supported within the heat storage material of the second heat reservoir and coupled to condenser tubing 18 of copper via nipples 19 and 20 of nylon, or other plastic material, or thin tubing of copper, stainless steel, etc., to prevent bulk flow of heat from the first heat reservoir to the second. The system which is preferably evacuated contains only a thermodynamic fluid and its vapor in an amount just sufficient for evaporator 17. Thus, on charging, both systems will be heated, but on cool-down, no heat will be transferred by means of the heat transfer system from the inner heat exchanger to the outer heat exchanger.

In providing a system which will operate for a prolonged period of time, I prefer a built-in heat source in which the heat available to do the desired work is derived from the heat of fusion of a molten compound. Examples of substances which may be used in the fused state as a heat source are naphthalene ($C_{10}H_8$), cyanamide ($H_2NCN$), succinic anhydride ($CH_2CO)_2O$, hydrated sodium chromate ($Na_2CrO_4 \cdot 10H_2O$), hydrated sodium dibasic phosphate ($Na_2HPO_4 \cdot 12H_2O$), magnesium nitrate ($Mg(NO_3)_2$), etc.

Naphthalene which melts at about 184° F., exhibits a heat of fusion of about 64 B.t.u./lb. Cyanamide melts at about 109.4° F. and has a heat fusion of about 89 B.t.u./lb. Sodium chromate melts at about 73.4° F. and exhibits a heat of fusion of about 70 B.t.u./lb. Sodium dibasic phosphate melts at about 96.8° F. and on solidifying gives off about 120 B.t.u./lb. of salt.

Where a substance with a particular melting temperature is desired to suit a particular system, low melting eutectic mixtures may be employed. Details as to such mixtures need not be gone into here, such information being readily available in the literature.

Examples of heat transfer fluids together with the heats of vaporization which may be employed in carrying out the invention are given in the following table:

| Name | Formula | Temp., °F. | Heat of Vaporization, B.t.u./lb. |
|---|---|---|---|
| Acetone | $(CH_3)_2CO$ | 133.5 | 225 |
| Benzene | $C_6H_6$ | 176.0 | 170 |
| Carbon Tetrachloride | $CCl_4$ | 170.0 | 83 |
| Ethyl Alcohol | $C_2H_5OH$ | 173.0 | 366 |
| Ethyl Ether | $(C_2H_5)_2O$ | 94.5 | 150 |
| Freon 11 | $CCl_3F$ | 75.3 | 78 |
| Freon 113 | $CCl_2F-CClF_2$ | 117.6 | 68 |

Similarly, water may be employed as heat transfer fluid, its heat of vaporization being 540 b.t.u./lb. at 212° F.

Of course, it will be appreciated that these heat transfer fluids are not limited in use to the temperatures indicated since they can be adapted for any desired temperature in accordance with the pressure prevailing within the hermetically sealed heat transfer device. Generally, for my purposes, the system is evacuated before the heat-transfer fluid is sealed in it, whereby the fluid boils over a range of temperatures. Thus, heat exchange means for charging the package with heat (that is, regenerate the heat capacity of the heat sinks) may be provided after all the parts have been assembled. Such means may comprise a Calrod heating unit formed of a nickel-chromium electrical resistant heating element encased in a protective metal sheath 21 immersed in the heat storage material of the second heat reservoir 10, the heating element being connected by lines 22, 23 to a source of power supply not shown. A temperature measuring device 24 is provided coupled to the first reservoir to enable the reading of the temperature thereof during the charging as well as during use of the package. Similarly, a device 25 is provided to measure the temperature of the second reservoir.

Assuming that the temperature-sensitive object is to be controlled at a temperature of about 135° F. ± 2°, I might employ a heat storage material in the outer heat reservoir which may melt at a range of about 125° F. to 133° F. In the inner reservoir, I would employ a similar heat storage material which melts, let us say, within the 4° temperature differential over which the temperature of the object is precisely controlled; for example, a melting point of about 133° to 137° F.

As heat is charged into the second heat reservoir and its temperature rises, fluid in evaporator 17 vaporizes and the vapor circulated by convection to condenser 18 where it condenses and gives up its latent heat to the heat storage material in heat reservoir 5. The heat dumped into the first reservoir by means of the fluid heat-transfer system forms a heat shield around objects 3 and 3A at about the same temperature as the objects. When the temperature of the package has reached the desired level, for example a permissible maximum of 137° F., the power is shut off with the package now in a condition to become self-sustaining for a prolonged period. As will be understood, thermostats may be employed to control the heat charging period as described in my U.S. Patent No. 3,112,877 and No. 3,112,878. As will be apparent to one skilled in the art, the foregoing heat charging technique need not be used. For example, the objects and support 4 and the heat reservoirs may be placed in the package at their respective temperatures.

Assuming that the temperature of the first heat reservoir is about 136° F. and the second heat reservoir is about 133° F. and both are in the molten state, and also that the second heat reservoir contains, for example, 10 times by weight of heat storage material as the first heat reservoir, a system is provided whereby the heat loss of the instruments to outside the package is greatly impeded. Any loss of heat from the instruments will be greatly diminished, even until the heat storage material in the second reservoir freezes. In this way, the outer heat reservoir supplies bulk heat which is lost from the system, while the inner reservoir provides "control" heat. Should the temperature of the inner reservoir be slightly higher than the outer, heat cannot be transferred to the outer via the heat-transfer fluid since all the fluid would remain in evaporator 17. In addition, since the two heat reservoirs are separated by insulation, the rate of heat loss to the ambient environment is greatly inhibited and one can supply bulk heat while the other supplies control heat.

It is apparent from the foregoing that highly versatile self-sustaining temperature control systems are possible with my invention without requiring the use of valves or other control means for controlling the amount of heat transfer to make up for heat loss from the system.

Where it is desired to ship objects or substances at low temperatures in an environment having a temperature substantially higher than the temperature within the package, then I would employ a system the reverse of that shown in FIG. 1. Referring to FIG. 2, such a system is shown with a temperature sensitive object or substance 3a adapted to be controlled at say 20° F. ± 2° F. surrounded by an insulation support 4a. Spatially associated with the object is an inner heat sink 5 maintained at a temperature the same as that of the object. As in FIG. 1, the heat sink is made up of two hollow cup-shaped halves 6 and 7 having inner and outer casings 6a, 6b and 7a, 7b, respectively, of good heat-conductive material, such as copper, aluminum, etc. As in FIG. 1, the two cup-like shaped halves are disposed opposite each other and snugly about insulation 4a. Contained in the heat sink is a heat absorbing material characterized by a fairly large latent heat of melting or freezing. The material may comprise an aqueous solution of a substance which freezes, let us say at 20° F. Examples of aqueous solutions which freeze at 20° F. are: solutions containing, respectively: (a) about 12% by weight of methyl alcohol, (b) about 14% by weight of ethyl alcohol, (c) about 22.5% by weight of ethylene glycol, and (d) 30% by weight of glycerol and solutions containing eutectic salt mixtures.

Surrounding the inner heat sink is another layer of insulation 8a and surrounding it is an outer heat sink 10 also formed of two hollow cup-shaped halves 11 and 12 having inner and outer casings 11a, 11b and 12a, 12b of good heat conductive material as in FIG. 1, said outer heat sink being surrounded by insulation 16a.

The object is surrounded by a temperature shield provided by the inner heat sink at the temperature of the object. The two heat sinks may be thermally coupled by a closed circuit fluid heat-transfer system comprising evaporator tubing 17a supported within the first heat sink and coupled to condenser tubing 18a (both of, for example, copper) by means of nipples 19a and 20a of poor heat conductivity, the condenser 18a being supported within the second heat sink. Also supported within the second heat sink is a heat-exchange circuit 21a comprising a copper tubing coupled to a source of refrigerant, not shown, outside the package for regenerating the heat capacity of the heat sinks. Temperature measuring devices 24, 25 may be provided as in FIG. 1.

In preparing the package for the desired temperature, a refrigerant such as Freon 11, at a temperature not exceeding 20° F. is passed through heat exchanger 21a to remove heat from the outer heat sink. As the temperature of the outer heat sink drops to below that of the inner heat sink, heat-transfer fluid in evaporator 17a evaporates and transfers heat to the second heat sink. The cooling process is continued until the heat absorbing materials in each of the heat sinks freeze. Since the object is to be controlled at a temperature of about 20° F. ± 2° F., I propose that the material in the outer heat sink have a freezing point in the range of about 20° F. to 30° F., but cooled to about 20° F., the average temperature desired for the temperature sensitive object or substance, and the material in the inner heat sink have a freezing point of about 19° F. In this way, the latent heat of one heat storage material augments the latent heat of the other and thus permits the sustaining of the desired temperatures over a prolonged period without the use of automatic temperature control devices.

The insulation which may be employed in maintaining the system as close to adiabatic as possible may be one whose heat conductivity in British units ranges up to about 0.5 B.t.u./hr./sq. ft./° F./in. or from 0.2 to 0.5. As has been stated, I prefer to use urethane plastic foam which comes in various densities ranging from about 1 to 20 lbs. per cubic foot, e.g. 2 lbs./cu. ft., with heat conductivities varying with density up to about 0.3 B.t.u./hr./sq. ft./° F./in. I have found that foams of very low density, e.g. as low as 2 lbs./cu. ft., and of heat conductivities in the neighborhood of about 0.2 to be very useful in carrying out my invention. For my purposes, urethane foam materials are particularly adaptable as they may be foamed in place whereby to provide a vibration-resistant support for the temperature control system. Vinyl foams may also be employed. Certain other insulating materials of rather low heat conductivity may be used, such as cotton wool ($K=0.136$), hair felt ($K=0.36$), mineral wool ($K=0.27$), and the like, not to mention cork, santocel, glass wool, etc.

When insulating the temperature-sensitive object, it is desirable that the temperature of the insulation initially be very close and preferably equal to that of the object. In this way, I am able to start with a system that is initially adiabatic in principle so that the object will not be subject to any rapid falling off in temperature, particularly where the insulation is at least thick enough to inhibit a rapid loss in heat content.

While the two systems illustrated in FIGS. 1 and 2 show the object or sensitive instrument completely surrounded by an inner heat sink, this is not necessary. For example, the inner heat sink may be associated with the object as shown in FIG. 3, the assembled object and inner heat sink then being surrounded by a first insulation, and the insulation then being surrounded by an outer heat shield or heat sink, which heat sink in turn is surrounded by a second or outer insulation.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A self-sustaining temperature control package adapted to sustain a given temperature for prolonged periods which comprises, a container having insulatedly packed therein a temperature-sensitive object and a plurality of heat sinks, each containing a heat storage material therein characterized by a relatively high heat of fusion, an inner one of said heat sinks being thermally associated with said temperature-sensitive object, at least one other of said heat sinks being insulated from and surrounding said object and said inner heat sink, and an insulation surrounding at least said other heat sink within said container, such that any heat loss from said inner heat sink is greatly minimized.

2. The package of claim 1 wherein a heat-exchange means is associated with said at least one other heat sink for regenerating the heat capacity of said other heat sink.

3. The package of claim 2 including the provision of heat transfer means coupling said other heat sink to said inner heat sink, said heat-transfer means comprising a closed-circuit heat-transfer path containing a vaporizable fluid.

4. A self-sustaining temperature control package adapted to sustain a given temperature for prolonged periods which comprises, a container having insulatedly packed therein a temperature-sensitive object and an inner and an outer heat sink, each containing a heat storage material therein characterized by a relatively high heat of fusion, said inner heat sink being thermally associated with said temperature-sensitive object, said outer heat sink being insulated from and surrounding said inner heat sink, an insulation surrounding said outer heat sink within said container, such that any heat loss from said inner heat sink is greatly minimized, and a one-way closed circuit heat-transfer path having confined therein a vaporizable fluid coupling said outer heat sink to said inner heat sink.

5. The package of claim 4 wherein a heat-exchange means is associated with said outer heat sink for regenerating the heat capacity of the outer heat sink and through it the heat capacity of the inner heat sink.

6. The package of claim 5 wherein said heat-exchange means is a heater for regenerating the heat content of the outer heat sink and through it the heat content of the inner heat sink.

7. The package of claim 5 wherein the heat-exchange means is a cooling system for extracting heat absorbed from the ambient environment and through it for extracting heat from the inner heat sink.

8. A method for providing a self-sustaining temperature control package for use in controlling the temperature of an object over a prolonged period of time which comprises, insulating the object from the ambient environment, providing an inner heat sink thermally associated with said object, providing a further insulation about said heat sink and said object, surrounding the said further insulation by an outer heat sink having means associated therewith for regenerating the heat capacity thereof, coupling said heat sinks together via a one-way closed-circuit heat-transfer path containing a vaporizable heat-transfer fluid, and then insulating the whole assembly from the ambient environment under substantially adiabatic conditions.

References Cited by the Examiner

UNITED STATES PATENTS

| 3,093,308 | 6/1963 | Snelling | 231—1 |
| 3,112,877 | 12/1963 | Snelling | 236—1 |
| 3,112,878 | 12/1963 | Snelling | 236—1 |

EDWARD J. MICHAEL, *Primary Examiner.*